(12) United States Patent
Kwak et al.

(10) Patent No.: US 7,756,329 B2
(45) Date of Patent: Jul. 13, 2010

(54) COLOR CONVERSION APPARATUS AND METHOD FOR SELECTIVELY ADJUSTING INPUT IMAGE COLORS

(75) Inventors: Young-shin Kwak, Suwon-si (KR); Du-sik Park, Suwon-si (KR); Hyun-wook Ok, Goyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1154 days.

(21) Appl. No.: 11/358,036

(22) Filed: Feb. 22, 2006

(65) Prior Publication Data

US 2006/0188156 A1   Aug. 24, 2006

(30) Foreign Application Priority Data

Feb. 22, 2005   (KR) .................. 10-2005-0014581

(51) Int. Cl.
  *G06K 9/00* (2006.01)
(52) U.S. Cl. .................. 382/167; 382/162; 382/274; 382/302; 358/1.9; 358/504
(58) Field of Classification Search .............. 382/162, 382/165, 167, 274, 302; 358/1.9, 504, 518, 358/520, 2.1, 3.23; 345/603, 590
See application file for complete search history.

(56) References Cited

U.S. PATENT DOCUMENTS

| 5,202,935 | A | 4/1993 | Kanamori et al. |
| 5,384,601 | A | 1/1995 | Yamashita et al. |
| 5,937,089 | A | 8/1999 | Kobayashi |
| 2002/0126302 | A1 * | 9/2002 | Fukao .................. 358/1.9 |
| 2004/0135790 | A1 | 7/2004 | Moore |

(Continued)

FOREIGN PATENT DOCUMENTS

EP   1231777   8/2002

(Continued)

OTHER PUBLICATIONS

Japanese Office Action for corresponding Japanese Patent Application No. 2006-045595 dated Nov. 20, 2007.

(Continued)

*Primary Examiner*—Samir A Ahmed
*Assistant Examiner*—Ali Bayat
(74) *Attorney, Agent, or Firm*—Staas & Halsey LLP

(57) ABSTRACT

A color conversion method of selectively adjusting input colors, and an apparatus to perform the method, the method comprising converting an input color signal to a color signal in a color space that is based on a luminance component and a chromaticity component; determining whether the input color signal of each pixel is in a particular gamut to which the color is converted, within the whole color gamut of a color reproducing apparatus; performing a color conversion of the input color signal according to a shape of the particular gamut using a reference color, which is a reference of a conversion amount of the input color signal and present in the particular gamut, and a target color which is converted from the reference color; and converting the input color signal, which is converted to the color space having the luminance component, to a color signal in a color space displayable on the color reproducing apparatus.

45 Claims, 10 Drawing Sheets

U.S. PATENT DOCUMENTS

| | | |
|---|---|---|
| 2004/0151370 A1 | 8/2004 | Sasaki |
| 2004/0156544 A1 | 8/2004 | Kajihara |
| 2005/0083346 A1* | 4/2005 | Takahashi et al. ........... 345/600 |
| 2006/0119870 A1* | 6/2006 | Ho et al. ...................... 358/1.9 |
| 2008/0117446 A1* | 5/2008 | Fukasawa ................... 358/1.9 |

FOREIGN PATENT DOCUMENTS

| | | |
|---|---|---|
| JP | 6-78320 | 3/1994 |
| JP | 2003-230160 | 8/2003 |
| JP | 2004-192614 | 7/2004 |
| JP | 2004-201314 | 7/2004 |
| JP | 2004-254303 | 9/2004 |

OTHER PUBLICATIONS

European Search Report for European Patent Application No. 06250859 dated Jun. 7, 2006 (in English).

Chinese Patent Office Action, issued Aug. 22, 2008 corresponding to Chinese Patent Application No. 200610057653.9 filed on Feb. 22, 2006.

Japanese Office Action for corresponding Japanese Application 2006-45595; issued Nov. 10, 2009.

* cited by examiner

COLOR CONVERSION APPARATUS AND METHOD FOR SELECTIVELY ADJUSTING INPUT IMAGE COLORS

CROSS-REFERENCE TO RELATED APPLICATIONS

This application claims the benefit of Korean Patent Application No. 2005-14581, filed on Feb. 22, 2005, in the Korean Intellectual Property Office, the disclosure of which is incorporated herein by reference.

BACKGROUND OF THE INVENTION

1. Field of the Invention

The present invention relates generally to a color conversion apparatus and method of selectively adjusting input image colors. More particularly, the present invention relates to a color conversion apparatus and method of selectively adjusting input image colors, that are present in a region defined as a polyhedron within a color gamut in a three-dimensional color space of a color reproducing apparatus, to colors preferred by a user.

2. Description of the Related Art

There is an existing desire to improve image quality by converting memory colors, such as colors of skin, sky, and grass, which are well retained in human memory, to colors preferred by users. However, conventional color reproducing apparatuses can adjust only chromaticity, but not change a luminance component, when converting a specific color such as a memory color to a user's desired color within its color gamut. Thus, the conventional apparatuses have a limitation in the image quality enhancement. In addition, a conventional three-dimensional color conversion method is applicable only to the gamut of a specific shape, and such a gamut is incapable of taking account of distribution of natural colors of a subject.

To overcome the above and/or other shortcomings, a three-dimensional color conversion technique is demanded which enables a user to select an arbitrary color in a color space so as to adjust not only the chromaticity but also the luminance component of the input image.

SUMMARY OF THE INVENTION

The present invention has been provided to address the above-mentioned and/or other problems and disadvantages occurring in the conventional arrangement, and an aspect of the present invention provides a color conversion apparatus and a method of selectively adjusting input image colors in a particular region to colors desired by a user by defining the particular region to be converted to a polyhedron in a three-dimensional color space, and converting the colors in the particular region based on a reference color which is arbitrarily determined by the user and a target color which is converted from the reference color.

Additional aspects and/or advantages of the invention will be set forth in part in the description which follows and, in part, will be apparent from the description, or may be learned by practice of the invention.

To achieve the above and/or other aspects of the present invention, a color conversion apparatus to selectively adjust input colors includes a first color space converter to convert an input color signal to a color signal in a color space that is based on a luminance component and a chromaticity component; a region determiner to determine whether the input color signal of each pixel is in a particular gamut to which the color is converted, within the whole color gamut of a color reproducing apparatus; a color converter to perform a color conversion of the input color signal according to a shape of the particular gamut using a reference color, which is a reference of the conversion amount of the input color signal and present in the particular gamut, and a target color which is converted from the reference color; and a second color space converter to convert the input color signal, which is converted to the color space having the luminance component, to a color signal in a color space displayable on the color reproducing apparatus.

The color conversion apparatus may further include a gamut storage to store information relating to the particular gamut, such as a minimum luminance value, a maximum luminance value, and vertices of the particular gamut in a polyhedron shape.

The region determiner may include a luminance comparator to determine whether a luminance component of the input color signal is in the particular gamut; a gamut calculator to calculate in the particular gamut a plane that has a fixed luminance value equal to a luminance value of the luminance component of the input color signal; and a region comparator to determine whether the input color signal is within the plane that has the fixed luminance value and is calculated by the gamut calculator.

The luminance comparator may determine whether the luminance component of the input color signal is greater than the minimum luminance value and less than the maximum luminance value of the particular gamut.

The color converter may include a distance calculator to calculate a distance of a line from the reference color in the particular gamut to a boundary of the particular gamut by way of the input color signal; and an output color calculator to convert the input color signal using a distance ratio of a triangle including the reference color, the target color, and an intersection point of the line and the boundary of the particular gamut.

The output color calculator may converts the input color signal according to a ratio of the distance between the reference color and the intersection point to a distance between the input color signal and the intersection point, which equals a ratio of a distance between the reference color and the target color to a distance between the input color signal to the converted color signal.

The color converter may perform the color conversion of the input color signal in response to the reference color being converted in a three-dimensional space of the particular gamut, and the particular gamut being a convex polyhedron.

The color converter may include a conversion vector calculator to calculate a color conversion vector between the reference color and the target color; a conversion amount calculator to calculate a relative color conversion amount of the conversion vector at a position of the input color signal; and an output color calculator to convert the input color signal using the relative color conversion amount.

The conversion amount calculator may include a reference point calculator to calculate a reference point on a line that includes the input color signal, wherein the line including the input color signal is parallel with a direction of the conversion vector; and a target point calculator to calculate a distance between the reference point and a target point to which the reference point is converted on the line including the reference point, as a relative distance between the reference color and the target color on a line passing through the reference color and the target color.

The color conversion apparatus may further include a weight calculator to calculate a weight to increase the relative color conversion amount as a difference between the luminance component of the input color signal and a luminance value of the reference color reduces during the calculation of the relative color conversion amount.

The color converter may perform the color conversion of the input color signal in response to the reference color being converted in the three-dimensional space of the particular gamut, and the particular gamut being a convex or a concave polyhedron.

The color converter may include a relative coordinate calculator to calculate a relative reference color, which is a relative position of the reference color in a luminance plane including the reference color, and a relative target color, which is a relative position of the target color in a luminance plane including the target color, among luminance planes of the particular gamut; a target point calculator to calculate a reference point and a target point corresponding to the relative reference color and the relative target color respectively, in a luminance plane including the input color signal; a chromaticity converter to convert a chromaticity of the input color signal based on a vector between the reference point and the target point in a plane including the input color signal and having a fixed luminance; and a luminance converter to convert a luminance of the input color signal having the converted chromaticity based on a luminance change between the reference color and the target color.

The target point calculator may calculate the target point by applying a weight so that the vector to be used to convert the chromaticity of the input color signal increases as the luminance of the input color signal approaches a luminance of the reference color.

The luminance converter may convert the luminance of the input color signal by applying a weight so that the luminance change to be used to convert the luminance of the input color signal increases as the chromaticity component of the input color signal having the converted chromaticity approaches the target point.

The chromaticity converter may calculate a relative color conversion amount of the color conversion vector between the reference point and the target point at the position of the input color signal, and converts the chromaticity of the input color signal in proportion to the relative color conversion amount.

The chromaticity converter may convert the chromaticity of the input color signal using a distance ratio of a triangle that comprising the reference point, the target point, and an intersection point where a line, passing through the reference point and the input color signal, meets the boundary of the particular gamut.

The color converter may be adopted in response to the reference color being converted in the three-dimensional space of the particular gamut.

In accordance with another aspect of the present invention, there is provided a color conversion method of selectively adjusting input colors, the method including converting an input color signal to a color signal in a color space that is based on a luminance component and a chromaticity component; determining whether the input color signal of each pixel is in a particular gamut to which the color is converted, within the whole color gamut of a color reproducing apparatus; performing a color conversion of the input color signal according to a shape of the particular gamut using a reference color, which is a reference of a conversion amount of the input color signal and present in the particular gamut, and a target color which is converted from the reference color; and converting the input color signal which is converted to the color space having the luminance component, to a color signal in a color space displayable on the color reproducing apparatus.

The color conversion method may further include storing information relating to the particular gamut, wherein the information pertains to a minimum luminance value, a maximum luminance value, and vertices of the particular gamut which is a polyhedron.

The determining whether the input color signal of each pixel is in a particular gamut may include determining whether a luminance component of the input color signal is in the particular gamut; calculating in the particular gamut a plane that has a fixed luminance value equal to a luminance value of the luminance component of the input color signal; and determining whether the input color signal is within the calculated plane that has the fixed luminance value.

The determining of whether the luminance component of the input color signal is in the particular gamut may comprise determining whether the luminance component of the input color signal is greater than the minimum luminance value and less than the maximum luminance value of the particular gamut.

The performing the color conversion of the input color signal may include calculating a distance of a line from the reference color in the particular gamut to a boundary of the particular gamut by way of the input color signal; and converting the input color signal using a distance ratio of a triangle including the reference color, the target color, and an intersection point of the line and the boundary of the particular gamut.

The converting of the input color signal may be performed according to a ratio of the distance between the reference color and the intersection point to a distance between the the input color signal and the intersection point, which equals a ratio of a distance between the reference color and the target color to a distance between the input color signal to the converted color signal.

The color conversion of the input color signal may be performed in response to the reference color being converted in a three-dimensional space of the particular gamut, and the particular gamut being a convex polyhedron.

The performing the color conversion of the input color signal may include calculating a color conversion vector between the reference color and the target color; calculating a relative color conversion amount of the conversion vector at a position of the input color signal; and converting the input color signal using the relative color conversion amount.

The calculating of the relative conversion amount may include calculating a reference point on a line that includes the input color signal, wherein the line including the input color signal is parallel with a direction of the conversion vector; and calculating a distance between the reference point and a target point to which the reference point is converted on the line including the reference point, as a relative distance between the reference color and the target color on a line passing through the reference color and the target color.

The color conversion method may further include calculating a weight to increase the relative color conversion amount as a difference between the luminance component of the input color signal and a luminance value of the reference color reduces during the calculation of the relative color conversion amount.

The color conversion of the input color signal may be performed in response to the reference color being converted in the three-dimensional space of the particular gamut.

The performing the color conversion of the input color signal may include calculating a relative reference color, which is a relative position of the reference color in a luminance plane including the reference color, and a relative target color, which is a relative position of the target color in a luminance plane including the target color, among luminance planes of the particular gamut; calculating a reference point and a target point corresponding to the relative reference color and the relative target color respectively, in a luminance plane including the input color signal; converting a chromaticity of the input color signal based on a vector from the reference point to the target point in a plane including the input color signal and having a fixed luminance; and converting a luminance of the input color signal having the converting chromaticity based on a luminance change between the reference color and the target color.

The target point may be calculated by applying a weight so that the vector to be used to convert the chromaticity of the input color signal increases as the luminance of the input color signal approaches a luminance of the reference color.

The luminance of the input color signal may be converted by applying a weight so that the luminance change to be used to convert the luminance of the input color signal increases as the chromaticity component of the input color signal having the converted chromaticity approaches the target point.

The calculating of the chromaticity may calculate a relative color conversion amount of the color conversion vector between the reference point and the target point at the position of the input color signal, and convert the chromaticity of the input color signal in proportion to the relative color conversion amount.

The chromaticity of the input color signal may be converted using a distance ratio of a triangle comprising the reference point, the target point, and an intersection point where a line, passing through the reference point and the input color signal, meets the boundary of the particular gamut.

The performing the color conversion of the input color signal may be adopted in response to the reference color being converted in the three-dimensional space of the particular gamut.

According to another aspect of the present invention, there is provided at least one computer readable medium storing instructions that control at least one processor to perform a method of selectively adjusting input color signals, the method including converting an input color signal to a color signal in a color space that is based on a luminance component and a chromaticity component; determining whether the input color signal of each pixel is in a particular gamut to which the color is converted, within the whole color gamut of a color reproducing apparatus; performing a color conversion of the input color signal according to a shape of the particular gamut by use of a reference color, which is a reference of a conversion amount of the input color signal and present within the particular gamut, and a target color which is converted from the reference color; and converting the input color signal which is converted to the color space having the luminance component, to a color signal in a color space displayable on the color reproducing apparatus.

According to another aspect of the present invention, there is provided a color conversion method of selectively adjusting input colors, the method including performing a color conversion of an input color signal according to a shape of an available gamut using a reference color, the reference color being a reference to a conversion amount of the input color signal and being present in the available gamut, and a target color which is converted from the reference color; and converting the input color signal to a color space displayable on a color reproducing apparatus.

According to another aspect of the present invention, there is provided a color conversion apparatus to selectively adjust input colors, the apparatus comprising a color converter to perform a color conversion of an input color signal according to a shape of an available gamut using a reference color, the reference color being a reference to a conversion amount of the input color signal and being present in the available gamut, and a target color which is converted from the reference color; and a color space converter to convert the input color signal to a color space displayable on a color reproducing apparatus.

BRIEF DESCRIPTION OF THE DRAWINGS

These and/or other aspects and advantages of the invention will become apparent and more readily appreciated from the following description of the embodiments, taken in conjunction with the accompanying drawing figures of which.

DETAILED DESCRIPTION OF THE PREFERRED EMBODIMENTS

Figure 1:
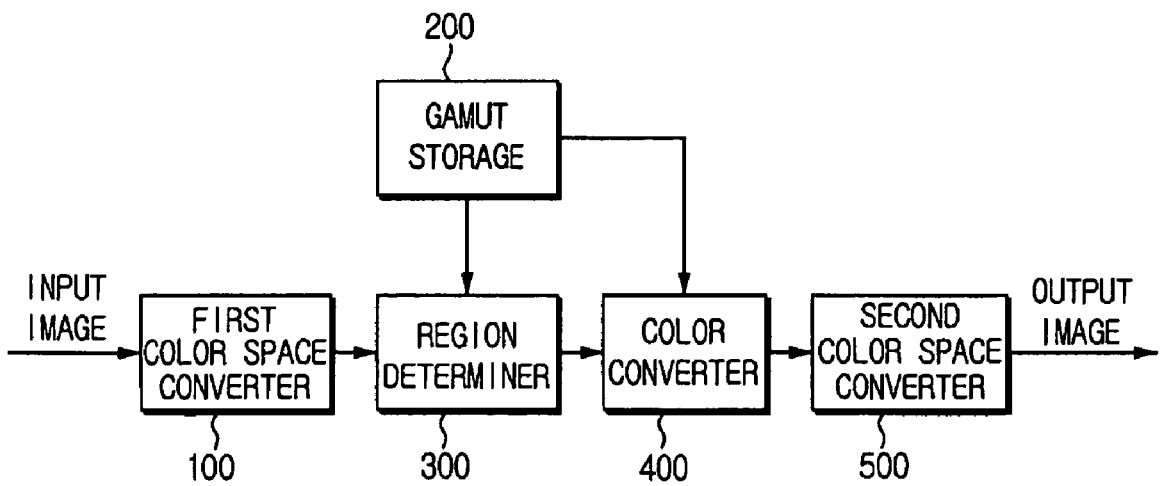
FIG. 1 is a block diagram illustrating a color conversion apparatus to selectively adjust input image colors according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

In the following description, drawing reference numerals may be repeated to describe repeated elements in different drawings. Some matters may be defined in the description along with detailed construction and element descriptions, however, these elements are merely provided to assist in a comprehensive understanding of the invention. Thus, it is apparent that the present invention may be carried out without those particularly described elements. Also, well-known functions or constructions may not be described in detail, so as not to obscure the invention in unnecessary detail.

Hereinafter, it is exemplified that input image colors are adjusted in a YCbCr color space. However, the present invention is not limited to this color space.

FIG. 1 is a block diagram illustrating a color conversion apparatus to selectively adjust input image colors according to an embodiment of the present invention.

Referring initially to FIG. 1, the color conversion apparatus includes a first color space converter 100, a gamut storage 200, a region determiner 300, a color converter 400, and a second color space converter 500.

The first color space converter 100 converts a color space of an input color signal to a color space including luminance. For instance, the first color space converter 100 may convert an input color signal of RGB coordinates into a color space including the luminance such as YCbCr color space, LCH color space, and La*b* color space. Such a conversion is executed to adjust the luminance, as well as hue and saturation, for the sake of the change from a particular color to a user's preferred color.

The gamut storage 200 stores information relating to a particular gamut, among the entire gamut of a color reproducing apparatus, to be converted and defined, and which may be represented as a polyhedron having a certain number of vertices in a three-dimensional color space. The stored gamut information pertains to vertices of a gamut that includes a minimum luminance value and a maximum luminance value. Note that the gamut, which may be represented as a polyhedron with a certain number of vertices, is predetermined at the color reproducing apparatus.

The region determiner 300 determines whether a color signal of each pixel of the input image is present within the particular gamut stored in the gamut storage 200. The determination as to whether the input color is in the particular gamut is made by use of a CbCr plane having luminance value of the input color.

The color converter 400 converts the input color, which is present in the particular gamut in the predetermined three-dimensional color space, to a color preferred by the user.

The second color space converter 500 converts the color signal of the input image, which is converted into the color space having the luminance, to a color space, such as RGB color space, to be used to reproduce the color signal of the input image.

Figure 2:
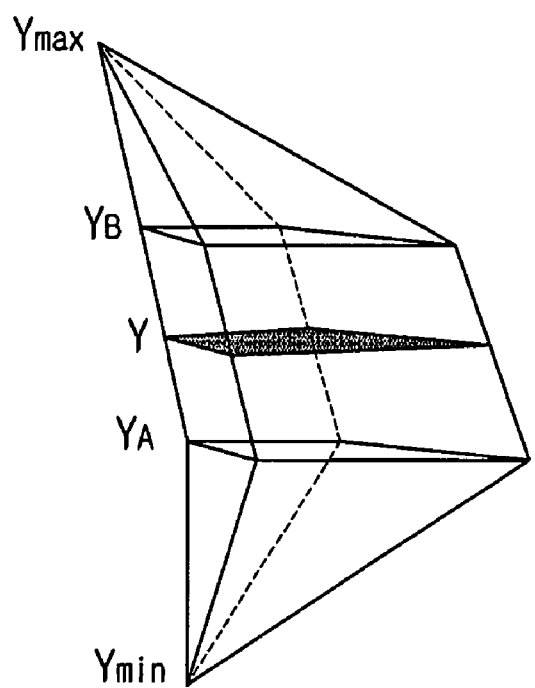
FIG. 2 is a diagram illustrating an operation of the gamut storage of FIG. 1.

FIG. 2 is a diagram illustrating an operation of the gamut storage 200 of FIG. 1.

Referring to FIG. 2, the gamut storage 200 stores information regarding a particular gamut, which may be represented as the polyhedron illustrated in FIG. 2, and which exists within the whole color gamut of the color reproducing apparatus, in the three-dimensional color space. The particular gamut stored in the gamut storage 200 is a predetermined gamut to be adjusted to colors desired by the user. The information regarding the particular gamut includes vertices defining the polyhedron in the three-dimensional color space, and includes a maximum luminance value and a minimum luminance value.

The particular gamut, as illustrated in FIG. 2, is a dodecahedron having 10 vertices. Color signals of the input image in the particular gamut, which is a dodecahedron, are converted to other colors within the particular gamut. At this time, the colors in the particular gamut are to be converted to colors desired by the user, and may be memory colors such as, for example, colors of sky, skin, and grass.

Figure 3:
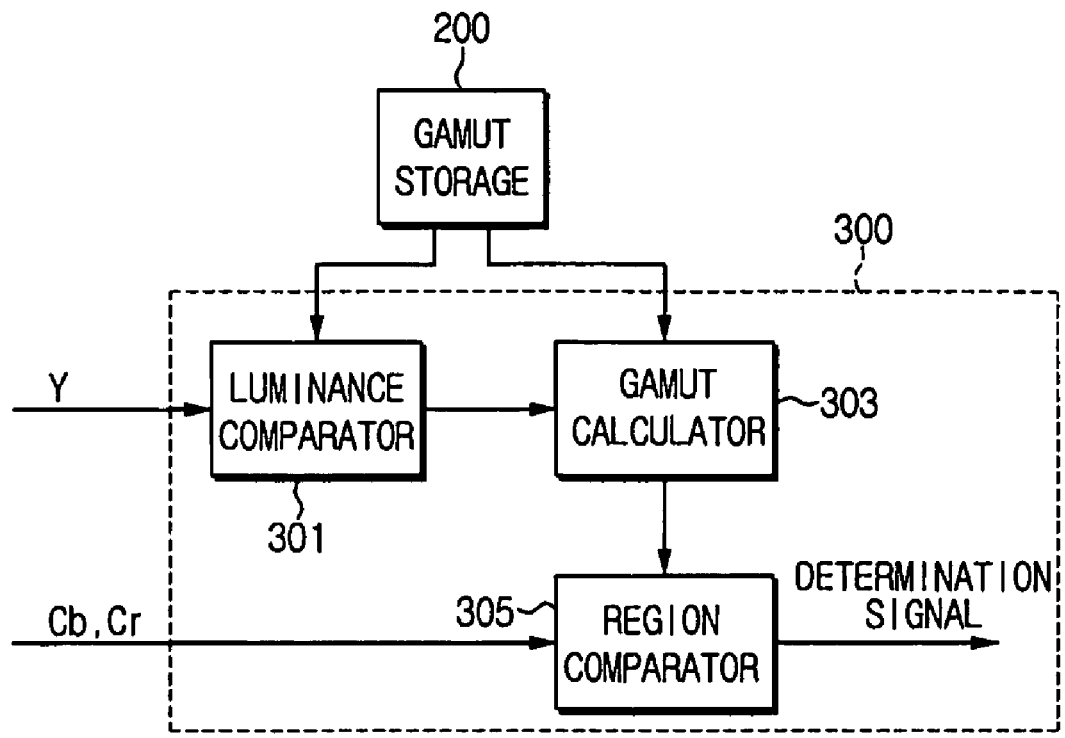
FIG. 3 is a block diagram illustrating the region determiner of FIG. 1.

FIG. 3 is a block diagram illustrating the region determiner 300 of FIG. 1.

Referring to FIG. 3, the region determiner 300 includes a luminance comparator 301, a gamut calculator 303, and a region comparator 305. The luminance comparator 301 compares the luminance value of the input color signal, which has been converted into the YCbCr color space by the first color space converter 100, with a luminance value of the particular gamut stored in the gamut storage 200. Specifically, the luminance value of the input color signal is compared with each of the minimum luminance value and the maximum luminance value of the particular gamut, and it is thus determined whether the luminance value of the input color signal is in a certain gamut range.

In a case in which the luminance value of the input color signal is present in the certain gamut range, the gamut calculator 303 calculates a boundary of a gamut in a plane defined by input color signals except for the luminance signal, that is, in a CbCr plane having a fixed luminance value of the input color signal.

The region comparator 305 determines whether a Cb signal and a Cr signal of the input color signal are within the gamut boundary of the CbCr plane, which is defined at the gamut calculator 303, based on the gamut boundary of the CbCr plane having the luminance value. In short, a determination is made regarding whether the input color signal corresponds to a color within the particular gamut.

In a case in which the input color signal is within the particular gamut according to a result of the determination, a determination signal notifying that the input color signal is present in the particular gamut is outputted to the color converter 400 to perform the color conversion of the input color signal. Conversely, in a case in which the input color signal is not within the particular gamut, the color conversion of the input color signal is not conducted.

Figure 4A:
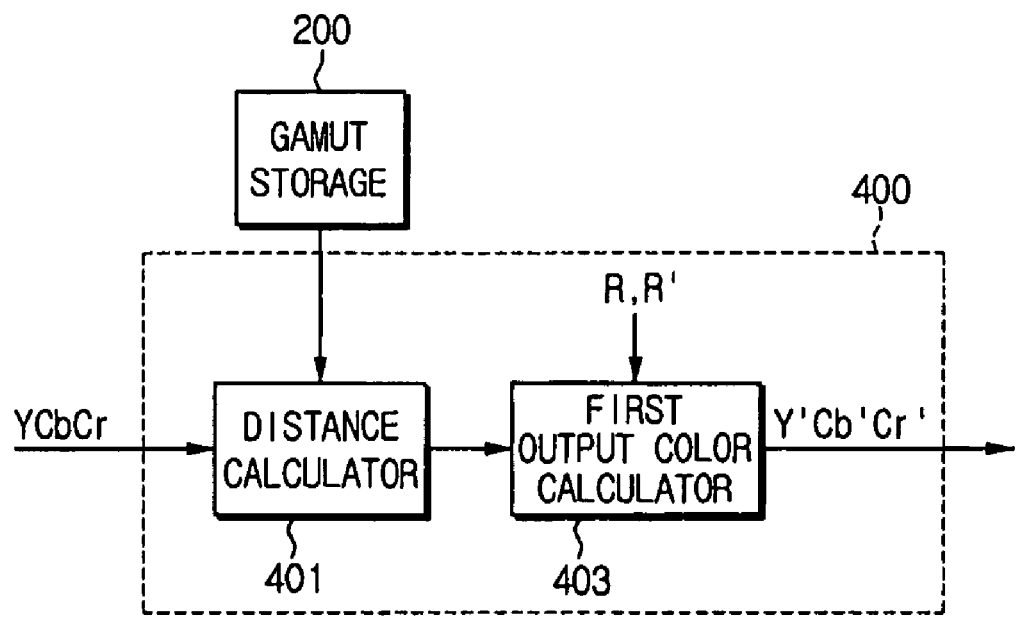
FIGS. 4A and 4B illustrate the color converter of FIG. 1 according an embodiment of the present invention.
Figure 4B:
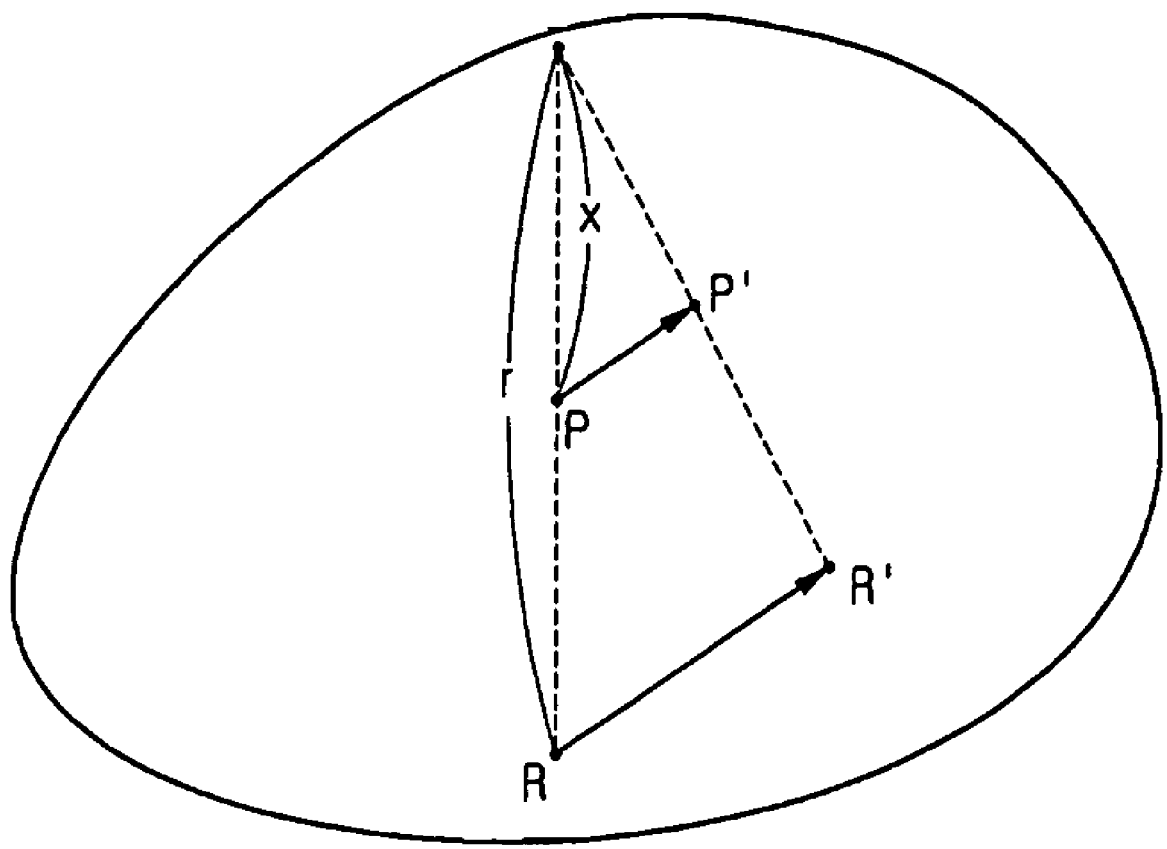

FIGS. 4A and 4B are diagrams illustrating the color converter 400, and a color conversion operation performed by the color converter 400, of FIG. 1 according to an embodiment of the present invention. Particularly, FIG. 4A is a block diagram illustrating the color converter 400 according to this embodiment of the present invention, and FIG. 4B is a diagram illustrating a color conversion of the input color signal by the color converter 400 according to this embodiment of the present invention.

Referring first to FIG. 4A, the color converter 400, according to this embodiment of the present invention, converts the input color signal by use of a distance between a reference color, which is a reference of the color conversion of the input color signal within the particular gamut, and a target color converted from the reference color, and a distance between the reference color and the boundary of the particular gamut passing through the input color. Note that information relating to the reference color and the target color may be provided from outside the color conversion apparatus, such as, for example, by a user's setting.

According to this embodiment of the present invention, the color converter 400 includes a distance calculator 401 and a first output color calculator 403. The distance calculator 401 computes the distance between the reference color and the boundary of the particular gamut passing through the input color from the reference color. The first output color calculator 403 computes the converted color within the particular gamut by use of a preset reference color, a target color converted from the reference color, the input color signal, and distance obtained at the distance calculator 401, to the boundary of the particular gamut that starts from the reference color and passes through the input color signal.

Referring to FIG. 4B, a closed curve represents the three-dimensional gamut in an arbitrary shape on the YCbCr space, R indicates the reference color, and R' indicates the target color converted from the reference color. P indicates the input color signal, and P' is the converted color from the input color signal, produced by the color converter 400, according to this embodiment of the present invention. L indicates a point at which an extension line drawn from the reference color R, via the input color signal P, meets the gamut boundary, and r indicates the distance from the reference color R to the boundary by way of the input color signal P, that is, the distance between the reference color R and the point L. The converted input color signal produced by the color converter 400 can be given by Equation 1.

$$\vec{P}' = \vec{P} + \frac{r - \|\vec{P} - \vec{R}\|}{r}(\vec{R}' - \vec{R})$$ [Equation 1]

In Equation 1, $\vec{P}'$ is the converted color signal, $\vec{P}$ is the input color signal, and r is the distance from the reference color R to the boundary of the particular gamut by way of the input color signal P. R is the reference color, and R' is the target color converted from the reference color.

As can be seen from Equation 1, the converted color signal produced by the color converter 400 can be obtained based on a proportional expression of the distances in the triangle that is formed by the reference color R, the target color R', and the point L at which the extension line from the reference color R through the input color signal P meets the boundary of the color gamut. The ratio of the distance between the reference color R and the target color R' to the distance between the input color signal P and the converted color signal P' is equal to the ratio of the distance r between the point L and the reference color R to the distance x between the point L and the input color P. The converted color signal $\vec{P}'$ is calculated based on this equal ratio.

The color converter 400 according to this embodiment of the present invention is applicable to convex polyhedral gamuts. As for a concave polyhedral gamut, the line drawn from the reference color R to the gamut boundary by way of the input color signal P may be in part present outside the gamut. In this situation, the color conversion of the input color signal is infeasible.

Figure 5A:
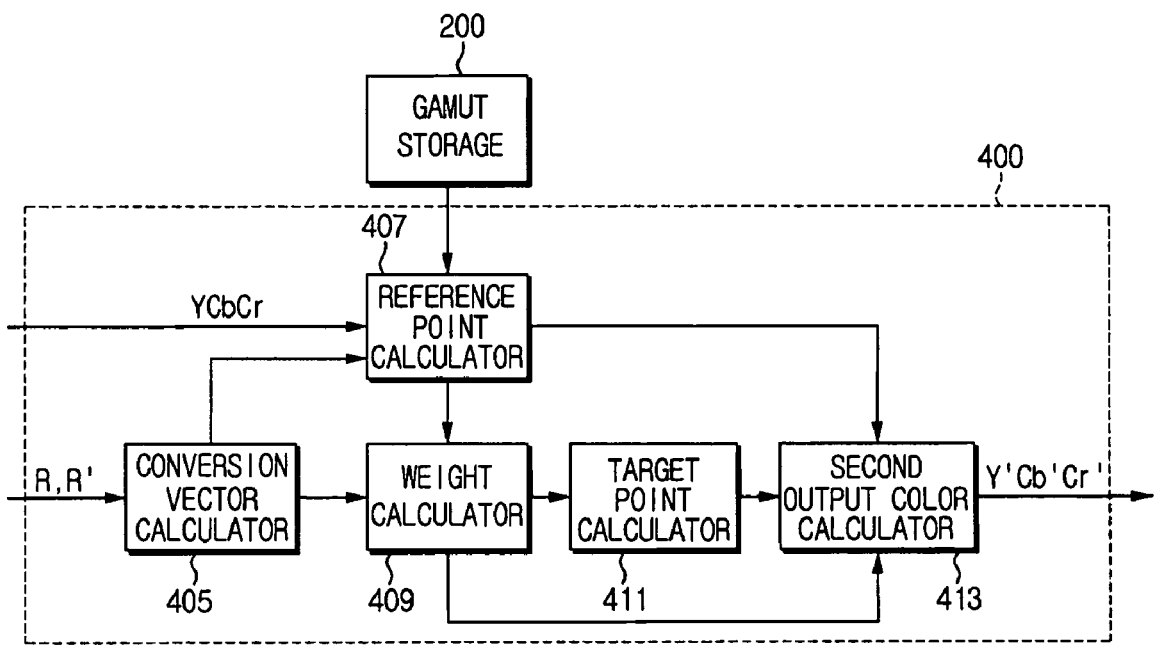
FIGS. 5A through 5C illustrate the color converter of FIG. 1 according to another embodiment of the present invention.
Figure 5B:
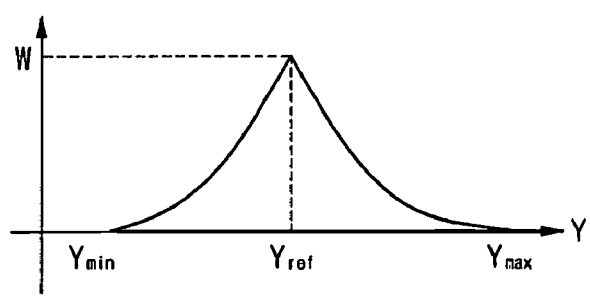
Figure 5C:
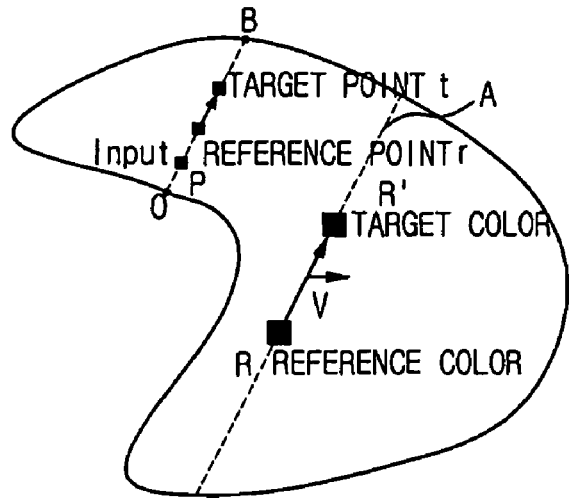

FIGS. 5A through 5C are diagrams illustrating a color converter 400, and operations of the color converter 400, according to another embodiment of the present invention. Particularly, FIG. 5A is a block diagram illustrating the color converter 400 according to this embodiment of the present invention, FIG. 5B is a diagram illustrating an operation of a weight calculator 409 of the color converter 400 of FIG. 5A, and FIG. 5C is a diagram illustrating an operation of the color converter 400 of FIG. 5A.

Referring to FIG. 5A, the color converter 400 according to this embodiment of the present invention includes a conversion vector calculator 405, a reference point calculator 407, a weight calculator 409, a target point calculator 411, and a second output color calculator 413. The color converter 400 converts the input color by use of a vector from the reference color R to the target color R', and a weight W applied based on the luminance of the input color.

The conversion vector calculator 405 calculates the vector, and a unit conversion vector for the color conversion, from the reference color R to the target color R'. The color conversion vector from the reference color R to the target color R' is represented as V, and after V is calculated, the unit conversion vector u is calculated by V/|V|.

The reference point calculator 407 detects a line which includes the input color signal P, the line being parallel with the conversion direction from the reference color R to the target color R' by use of the unit conversion vector u, which is obtained by the conversion vector calculator 405, and sets a point corresponding to a relatively same position of the reference color R, among values present on the detected line, to a reference point r.

The weight calculator 409 calculates a weight used for the calculation of the target point to which the reference point r is converted according to this embodiment of the present invention. The weight is intended to apply less conversion amount as the input color recedes from the reference color R when the target point t to which the reference color R is converted is calculated based on the conversion vector from the reference color R to the target color R'.

The target point calculator 411 calculates the target point by use of the reference point acquired by the reference point calculator 407, and the weight acquired by the weight calculator 409. The target point t is obtained by applying the calculated weight to the conversion amount of the reference point r on a line connecting from the reference point r to the gamut boundary by way of the input color signal based on the relatively same position as the conversion vector on the line drawn from the reference color R to the gamut boundary by way of the target color R'.

The second output color calculator 413 computes the resultant output color converted from the input color signal by use of the reference point r obtained by the reference point calculator 407 and the target point t obtained by the target point calculator 411.

In FIG. 5B, a horizontal axis indicates the luminance Y, and a vertical axis indicates the weight W applied to calculate the target point t. The weight is calculated so that the maximum color change is shown from the reference color R to the target point t, and the amount of the color change reduces as the input color P recedes from the reference color R. Accordingly, the weight W increases as approaching the reference point r in the region having the minimum luminance value at an end of the gamut plane, and decreases as proceeding from the reference point r to the region having the maximum luminance value at the other end of the gamut plane.

Referring now to FIG. 5C, a line passing through the reference color R and the target color R', which is converted from the reference color R, is represented as A. Then, the reference point calculator 407 detects a line B, among lines in parallel with the line A, including the input color P, and sets a point, on the line B, at the relatively same position as the reference color R on the line A, to the reference point r. The target point calculator 411 calculates the target point t by applying the weight to the ratio of the distance between the reference color R and the target color R' to the length of the line A, and the ratio of the distance between the reference point r and the target point t to the length of the line B.

Using the reference point r obtained by the reference point calculator 407 and the target point t obtained by the target point calculator 411, the second output color calculator 413 can convert the input color signal based on Equation 2.

P:r=P':t P<r

B-P:B-P'=B-x:B-t P≧r   [Equation 2]

In Equation 2, P denotes the distance from the input color signal to a 0 point, which is one of the intersection points of the line B and the gamut boundary, P' denotes the distance from the 0 point to a color signal converted from the input color signal, r denotes the distance from the 0 point to the reference point, and t denotes the distance from the 0 point to the target point. B denotes the line passing through the reference point r and the target point t converted from the reference point r. As can be seen in Equation 2, when the distance from the 0 point to the input color signal is shorter than the distance from the 0 point to the reference point, the input color signal is converted using the ratio of the distance P to the input color signal to the distance r to the reference point and the ratio of the distance P' to the converted color signal and the distance t to the target point based on the 0 point, which is one of the intersection points between the line B and the gamut boundary. In contrast, in a case in which the distance to the input color signal is longer than the distance to the reference point, the conversion of the input color signal is carried out using the distance ratios based on a B point, which is another intersection point of the line B and the gamut boundary.

Figure 6A:
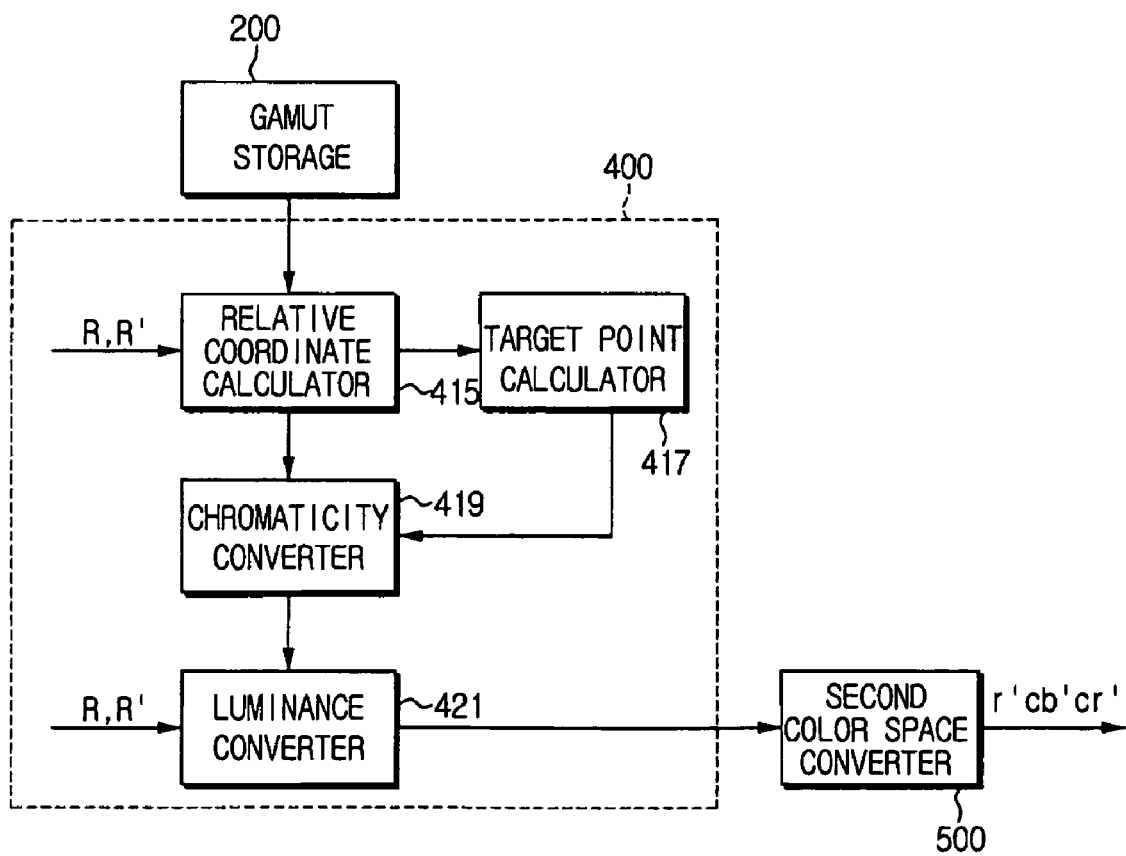
FIGS. 6A through 6E illustrate the color converter of FIG. 1 according to yet another embodiment of the present invention.
Figure 6B:
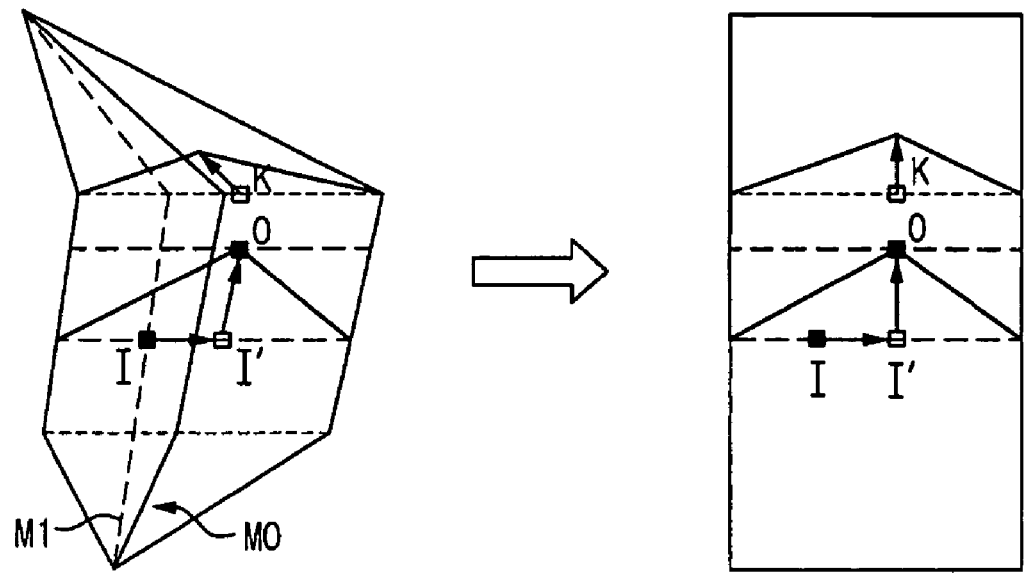
Figure 6C:
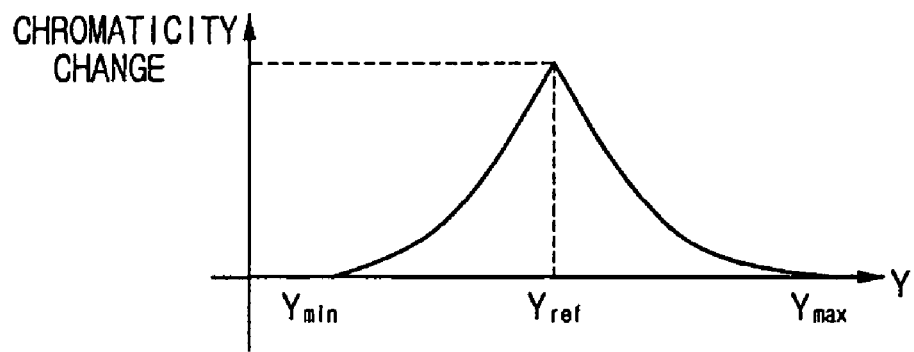
Figure 6D:
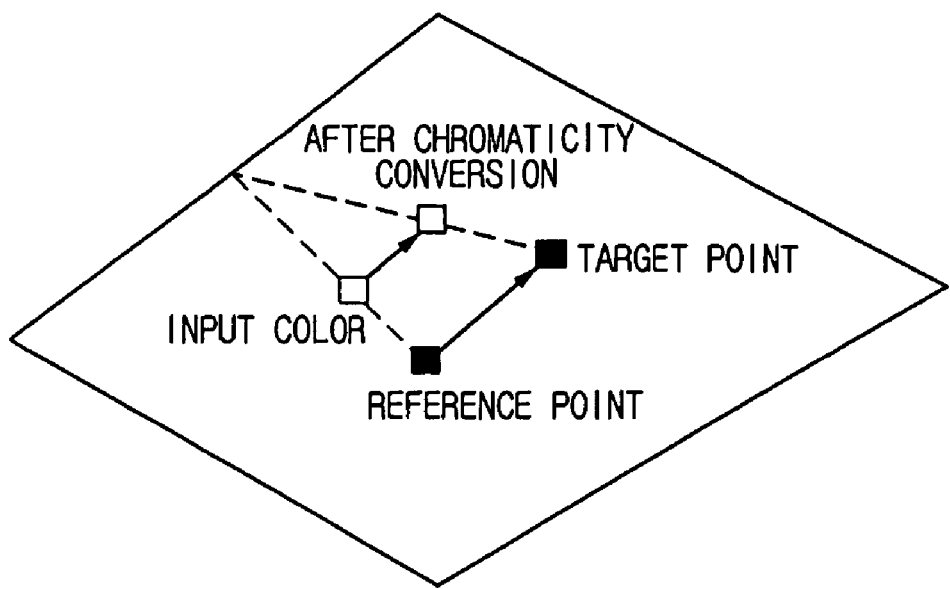
Figure 6E:
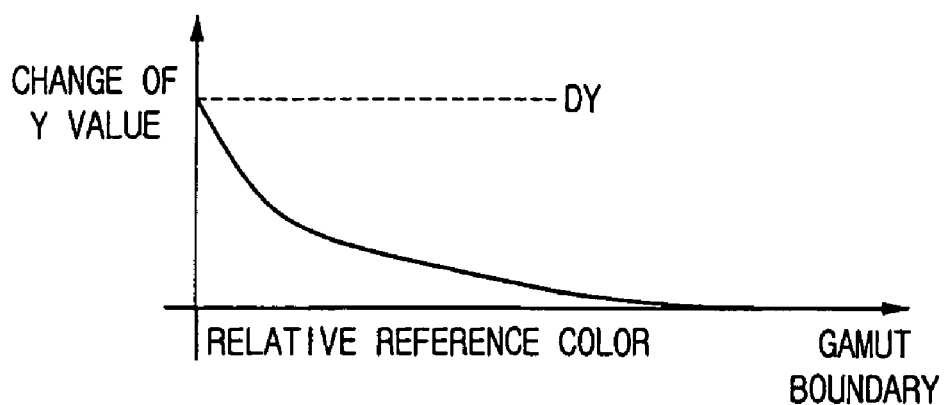

FIGS. 6A through 6E are diagrams illustrating a color converter 400, and an operation of the color converter 400, according to yet another embodiment of the present invention. FIG. 6A illustrates a block diagram of the color converter 400, and FIG. 6B illustrates an operation of a relative coordinate calculator 415 of the color converter 400. FIG. 6C illustrates how to calculate a relative target color depending on the luminance value used at the target point calculator 417, FIG. 6D illustrates an operation of a chromaticity converter 419 according to this embodiment of the present invention, and FIG. 6E illustrates an operation of a luminance converter 412 according to this embodiment of the present invention.

In FIG. 6A, the color converter 400, according to this embodiment of the present invention, first converts the chromaticity, and then the luminance, on a two-dimensional plane, which is a CbCr plane with the fixed luminance, in order to convert the input color signal in the three-dimensional space. To execute the chromaticity conversion on the two-dimensional plane, the color converter 400 changes the chromaticity of the input color by conducting substantially the same color conversion operation as performed by the color converter 400 according to the previously illustrated embodiments of the present invention, on the two-dimensional plane, and then changes the luminance of the input color signal.

According to this embodiment of the present invention, the color converter 400 includes a relative coordinate calculator 415, a target point calculator 417, a chromaticity converter 419, and a luminance converter 421.

The relative coordinate calculator 415 calculates a relative reference color, which is a relative position of the reference color in a luminance plane including the reference color within the particular gamut to be converted, and a relative target color, which is a relative position of the target color in a plane including the target color. The relative position is the relative position from a center point when the gamut size is set to 1 based on the center point of the two-dimensional gamut defined in the luminance plane and the gamut size.

The target point calculator 417 calculates the reference point and the target point corresponding to the relative reference color, which is the relative position of the reference color, and the relative target color, which is the relative position of the target color, respectively, based on the center point and the size of the two-dimensional gamut that is defined on the luminance plane including the input color signal by use of the relative reference color and the relative target color that are obtained by the relative coordinate calculator 415. In the calculation of the target point, the weight is applied depending on the luminance value of the luminance plane that includes the input color signal. The target point is calculated such that the amount of the color conversion increases as proceeding from the minimum luminance value of the particular gamut to the luminance value of the reference color, and the conversion amount decreases as proceeding from the luminance value of the reference color to the maximum luminance value. In brief, the target point is calculated to increase the conversion amount as the difference between the luminance values of the reference color and the input color becomes smaller.

The chromaticity converter 419 converts the chromaticity of the input color signal in the plane having the fixed luminance and including the input color signal by use of the reference point and the target point that are obtained at the target point calculator 417. In other words, the chromaticity of the input color signal is converted using the conversion amount of the reference point and the target point in the plane having the fixed luminance and including the input color signal. The chromaticity conversion of the input color signal in the plane having the fixed luminance is realized by applying to the two-dimensional plane the color conversion by the color converter 400 according to the previously discussed embodiments of the present invention. The position of the input color with the chromaticity converted is computed to a relative position based on the center point and the size of the gamut that is defined in a plane having a fixed luminance which equals the luminance of the input color, and then is output to the luminance converter 421.

The luminance converter 421 converts the luminance of the input color signal having the converted chromaticity, and then outputs a corresponding position of the input color signal having the converted chromaticity in the luminance plane after the luminance conversion by use of the relative position that is obtained by the chromaticity converter 419. The luminance value of the input color signal is converted by calculating a luminance change of the target point which is obtained in the luminance plane including the input color signal based on the luminance change from the reference color to the target color, and using the calculated luminance change of the target point and the distance information relating to the target point and the input color having the converted chromaticity. In other words, after calculating the luminance change of the target point in the luminance plane including the input color signal based on the luminance difference between the reference color and the target color, the luminance conversion is conducted to the input color signal having the converted chromaticity by applying the calculated luminance change.

When converting the luminance of the input color signal, the weight is applied to decrease the obtained luminance change as the input color signal approaches the gamut boundary.

Referring to FIG. 6B, I indicates the reference color, I' indicates the reference color having the converted chromaticity, and O indicates the target color with the converted luminance after the chromaticity conversion. M0 indicates a line that connects center points of the two-dimensional gamuts defined in the plane having the fixed luminance, within the three-dimensional gamut, and Ml indicates a line passing through the reference point that is calculated according to the shape of the particular gamut. When the size of the two-dimensional gamut defined in the respective luminance planes is normalized based on M0 as the reference line, the particular gamut can be represented as shown on the right in FIG. 6B. In short, according to this embodiment of the present invention, the chromaticity of the input color signal is converted in the two-dimensional space and then its luminance value alone is converted in the three-dimensional space.

FIG. 6C illustrates the weight applied when the target point calculator 417 calculates the target point which corresponds to the position in the luminance plane including the input color signal using a relative target color therein. The target point is calculated such that the chromaticity change increases as the luminance value of the input color signal approaches the reference color.

FIG. 6D illustrates the plane having the fixed luminance and including the input color signal, that is, the CbCr plane. When the reference point and the target point are given as shown in FIG. 6D, the chromaticity is converted in proportion to the distance between the reference point and the target point of the input color signal. This chromaticity conversion is substantially the same as the color conversion performed by the color converter 400 according to the first discussed embodiment of the present invention. Note that the chromaticity of the input color signal may be converted in the same manner as the color conversion by the color converter 400 according to the second discussed embodiment of the present invention, in the plane with the input color signal included and the luminance fixed.

FIG. 6E depicts a weight applied by the luminance converter 421 during the chromaticity conversion of the input color signal so that the luminance of the input color signal is converted to increase the luminance change as the input color signal approaches the target point, and the luminance of the input color signal is converted to decrease the luminance change as the input color signal approaches the gamut boundary.

Figure 7A:
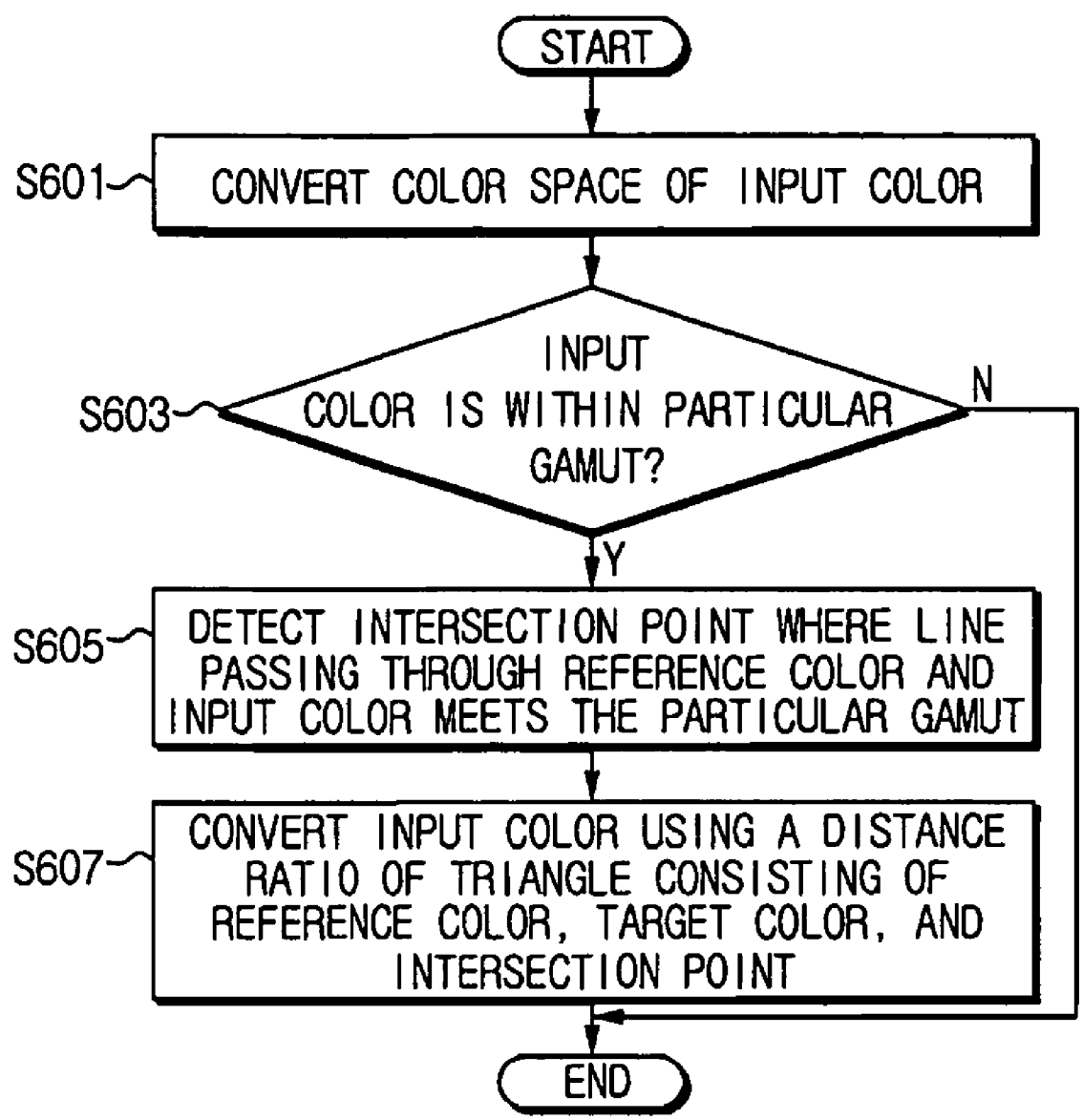
FIGS. 7A through 7C are flowcharts illustrating a color conversion method of selectively adjusting input image colors according to an embodiment of the present invention.
Figure 7B:
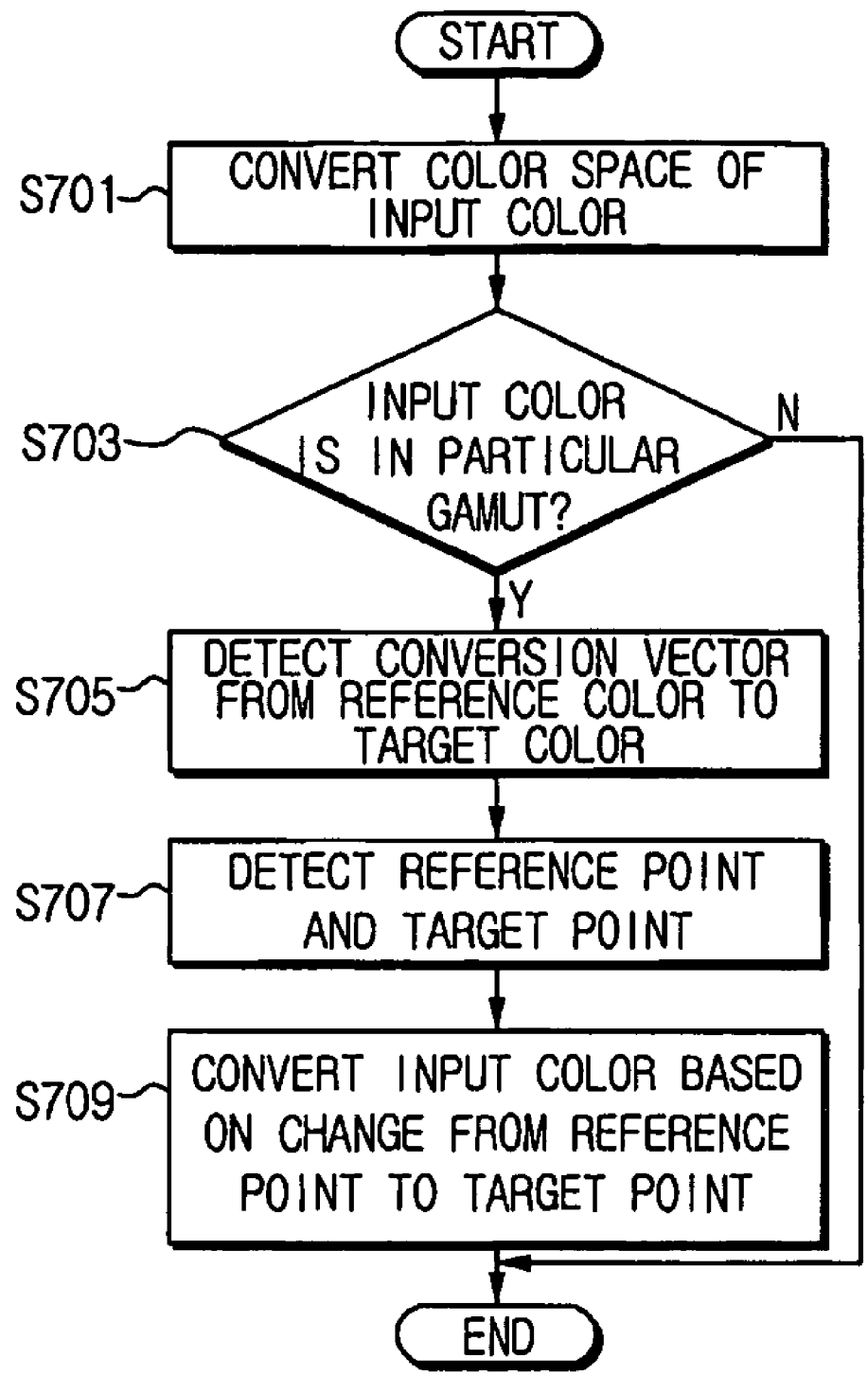
Figure 7C:
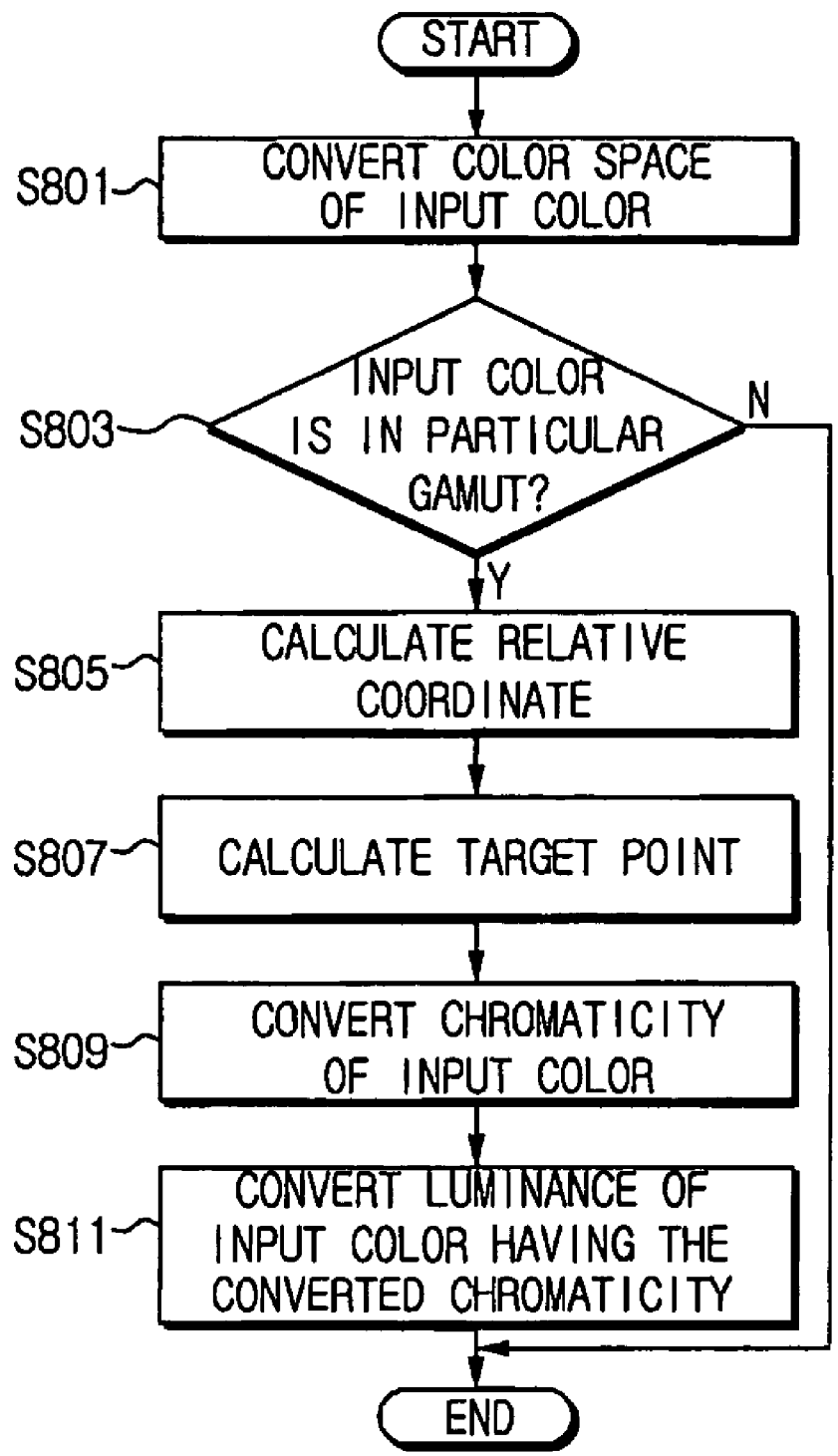

FIGS. 7A through 7C are flowcharts illustrating a color conversion method of selectively adjusting an input color according to embodiments of the present invention. Particularly, the color converter 400 according to the embodiment of the present invention illustrated in FIG. 4A is employed in FIG. 7A, the color converter 400 according to the embodiment of the present invention illustrated in FIG. 5A is employed in FIG. 7B, and the color converter 400 according to the embodiment of the present invention illustrated in FIG. 6A is employed in FIG. 7C. In the following descriptions, it is exemplified that the input color signal is converted into the YCbCr color space, but the method is not limited to this color space.

Referring to FIG. 7A, a color space of the input color signal is converted to a color signal including the luminance (S601). For example, the input color signal with the RGB coordinates may be converted to a color space including the luminance, such as, for example, YCbCr color space, LCH color space, La*b* color space, and the like. The conversion to such a color space aims to change the luminance, as well as the hue and the saturation, to adjust a specific color to a user's preferred color.

Next, a determination is made as to whether the input color signal is present in a particular gamut of a display device that can reproduce a color (S603). At this time, the particular gamut may be defined as a polyhedron having a certain number of vertices in the three-dimensional color space, and information as to the particular gamut is prescribed.

Whether the input color signal is within the particular gamut can be determined by comparing a luminance signal of the input color, converted to the YCbCr color space, with a pre-stored luminance value of the particular gamut. In further detail, the luminance value of the input color signal is compared with the minimum luminance value and the maximum luminance value of the particular gamut to thus determine whether the luminance value of the input color signal is within the particular gamut.

When the luminance value of the input color is within the particular gamut, the boundary of the particular gamut having the same luminance value of the input color signal is calculated in a plane with the fixed luminance value. That is, a CbCr plane having a fixed luminance value equal to the luminance value of the input color signal is calculated in the particular gamut. In addition, a determination is made as to whether the Cb signal and Cr signal values of the input color are included in the gamut boundary that is calculated in the CbCr plane with the luminance value of the input color signal.

When the input color is a color signal within the particular gamut according to the determination, a determination signal notifying that the input color is within the particular gamut is output to the color converter 400 to perform the color conversion to the input color. Conversely, when the input color is a color signal outside the particular gamut, the color conversion of the input color is not conducted.

Next, an intersection point is detected with respect to the extension line to the particular gamut passing through the preset reference color and the input color (S605), and the distance between the reference color and the intersection point is computed. In a case in which the color converter 400 according to this embodiment of the present invention is used to convert the input color, the color conversion is carried out within the particular gamut using the preset reference color, the target color, the input color signal, and the distance from the reference color to the boundary of the particular gamut by way of the input color. Thus, the distance from the reference color to the boundary of the particular gamut by way of the input color is calculated.

The converted input color is obtained by use of the proportional expression with respect to the distances in the triangle which comprises the reference color, the target color, and the intersection point where the extension line passing through the reference color and the input color signal meets the gamut boundary (S607). The converted input color is obtained based on a feature that the ratio of the distance between the reference color and the target color to the distance between the input color signal and the converted color signal equals the ratio of the distance between the intersection point and the target color to the distance between the intersection point and the reference color, which has been explained earlier in reference to Equation 1 and FIG. 4B.

Referring now to FIG. 7B, operations S701 and S703 are similar to operations S601 and 603.

When the input color is within the particular gamut according to a determination (S703), a conversion vector is detected which converts the reference color to the target color (S705). In other words, a vector and a unit conversion vector that convert the reference color to the target color are calculated.

Next, the reference point and the target point are calculated based on the reference color, the target color, and the conversion vector (S707). Using the calculated unit conversion vector, a line including the input color is detected from lines in parallel with the direction of the color conversion from the reference color to the target color. A certain position among the values on the detected line is set to the reference point, and the relative amount to convert the input color signal on the detected line is calculated according to the conversion amount from the reference color to the target color. Note that the certain position is a relatively same position as the reference color along the detected line.

The input color signal is converted based on the conversion amount from the reference point to the target point (S709). After calculating the relative conversion amount between the detected reference point and the target point along the detected line according to the conversion amount from the reference color to the target color, the color conversion is carried out by applying the conversion amount relatively obtained with respect to the input color on the detected line. When the target point to which the reference point is to be converted is calculated based on the conversion vector that converts the reference color to the target color, a weight is applied such that a lower amount of the color conversion is applied as the input color recedes from the reference color.

In contrast, when the input color is not within the particular gamut according to the determination (S703), the conversion of the input color is not performed, and the operation ends.

Referring to FIG. 7C, operations S801 and S803 are similar to operations S601 and S603.

When the input color is within the particular gamut according to a determination (S803), a relative coordinate is calculated using a preset reference color and a preset target color (S805). Specifically, a relative reference color, which is a relative position of the reference color in the luminance plane including the reference color within the particular gamut to be converted, and a relative target color, which is a relative position of the target color in the luminance plane including the target color, are calculated. Note that the relative position indicates a position from the center point when the gamut size is set to 1, based on the center point and the size of the two-dimensional gamut that is defined on the luminance plane.

Next, the target point is calculated in the luminance plane including the input color by use of the relative reference color and the relative target color (S807). Specifically, the reference point and the target point, which correspond to the relative reference color and the relative target color respectively, are calculated based on the center point and the size of the two-dimensional gamut defined on the luminance plane including the input color.

When the target point is calculated, a weight is applied according to the luminance value of the luminance plane including the input color signal. The target point is calculated such that a greater weight is applied to a lower difference between the luminance value of the reference color and the luminance value of the input color.

The chromaticity of the input color signal is converted using the calculated reference point and target point in the plane that includes the input color and has the fixed luminance (S809). In further detail, the conversion to the chromaticity of the input color signal is performed by use of the change of the reference point and the target point in the plane that includes the input color and has the fixed luminance. The chromaticity conversion of the input color signal in the plane with the fixed luminance can be realized by applying the color conversion by the color converter 400, according to the embodiments of the present invention illustrated in FIGS. 4A and 5A, into the two-dimensional plane. The position of the input color after the chromaticity conversion is a relative position based on the center point and the size of the gamut defined in the plane that has the fixed luminance equal to the luminance of the input color.

Next, the luminance of the input color having the converted chromaticity is converted (S811). After converting the luminance of the input color signal having the converted chromaticity, the corresponding position of the input color signal in the luminance plane after the luminance conversion is produced by use of the relative position of the input color having the converted chromaticity in the converted luminance plane.

The luminance conversion of the input color signal is performed by calculating the luminance change of the target point based on the luminance change from the reference color to the target color in the luminance plane including the input color signal, and using the luminance change of the calculated target point and the distance information of the input color having the converted chromaticity.

After obtaining the luminance change of the target point in the luminance plane including the input color signal depending on the luminance change between the reference color and the target color in the luminance plane including the reference color, the luminance conversion is conducted by applying the calculated luminance change with respect to the input color signal having the converted chromaticity. When the luminance of the input color signal is converted, a weight is applied such that the calculated luminance change decreases as the input color signal approaches the gamut boundary.

In addition to the above-described embodiments, the methods of selectively adjusting the input color can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording/storage media (e.g., CD-ROMs, or DVDs), and transmission media such as carrier waves, as well as through the Internet, for example. The medium may also be a distributed network, so that the computer readable code/instructions is stored/transferred and executed in a distributed fashion. The computer readable code/instructions may be executed by one or more processors.

As set forth above, the present invention can adjust the luminance as well as the chromaticity to convert a specific color to a user's preferred color, and thus meets the demand of consumers.

Furthermore, the present invention is applicable to a gamut in an arbitrary shape in a case in which the color conversion is conducted in three-dimensional space. Such a gamut can reproduce an optimal image by taking account of the distribution of the colors of the subject.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A color conversion apparatus to selectively adjust input colors, comprising:
   a first color space converter to convert an input color signal to a color signal in a color space that is based on a luminance component and a chromaticity component;
   a region determiner to determine whether the input color signal of each pixel is in a particular gamut to which the color is converted, among gamuts of a color reproducing apparatus;
   a color converter to perform a color conversion of the input color signal according to a shape of the particular gamut using a reference color, which is a reference of a conversion amount of the input color signal and present in the particular gamut, and a target color which is converted from the reference color; and
   a second color space converter to convert the input color signal, which is converted to the color space having the luminance component, to a color signal in a color space displayable on the color reproducing apparatus.

2. The color conversion apparatus of claim 1, further comprising:
   a gamut storage to store information relating to the particular gamut, wherein the information includes a minimum luminance value, a maximum luminance value, and vertices of the particular gamut in a polyhedron shape.

3. The color conversion apparatus of claim 1, wherein the region determiner comprises:
   a luminance comparator to determine whether a luminance component of the input color signal is in the particular gamut;

a gamut calculator to calculate in the particular gamut a plane that has a fixed luminance value equal to a luminance value of the luminance component of the input color signal; and a region comparator to determine whether the input color signal is within the plane that has the fixed luminance value and is calculated by the gamut calculator.

4. The color conversion apparatus of claim 3, wherein the luminance comparator determines whether the luminance component of the input color signal is greater than the minimum luminance value and less than the maximum luminance value of the particular gamut.

5. The color conversion apparatus of claim 1, wherein the color converter comprises:

a distance calculator to calculate a distance of a line from the reference color in the particular gamut to a boundary of the particular gamut by way of the input color signal; and an output color calculator to convert the input color signal using a distance ratio of a triangle including the reference color, the target color, and an intersection point of the line and the boundary of the particular gamut.

6. The color conversion apparatus of claim 5, wherein the output color calculator converts the input color signal according to a ratio of the distance between the reference color and the intersection point to a distance between the input color signal and the intersection point, which equals a ratio of a distance between the reference color and the target color to a distance between the input color signal to the converted color signal.

7. The color conversion apparatus of claim 5, wherein the color converter performs the color conversion of the input color signal in response to the reference color being converted in a three-dimensional space of the particular gamut, and the particular gamut being a convex polyhedron.

8. The color conversion apparatus of claim 1, wherein the color converter comprises:

a conversion vector calculator to calculate a color conversion vector between the reference color and the target color;

a conversion amount calculator to calculate a relative color conversion amount of the conversion vector at a position of the input color signal; and an output color calculator to convert the input color signal using the relative color conversion amount.

9. The color conversion apparatus of claim 8, wherein the conversion amount calculator comprises:

a reference point calculator to calculate a reference point on a line that includes the input color signal, wherein the line including the input color signal is parallel with a direction of the conversion vector; and a target point calculator to calculate a distance between the reference color and the target color on a line passing through the reference color and the target color, as a relative distance between the reference point and a target point to which the reference point is converted on the line including the reference point.

10. The color conversion apparatus of claim 8, further comprising:

a weight calculator to calculate a weight to increase the relative color conversion amount as a difference between the luminance component of the input color signal and a luminance value of the reference color reduces during the calculation of the relative color conversion amount.

11. The color conversion apparatus of claim 8, wherein the color converter performs the color conversion of the input color signal in response to the reference color being converted in the three-dimensional space of the particular gamut, and the particular gamut being a concave polyhedron.

12. The color conversion apparatus of claim 1, wherein the color converter comprises:

a relative coordinate calculator to calculate a relative reference color, which is a relative position of the reference color in a luminance plane including the reference color, and a relative target color, which is a relative position of the target color in a luminance plane including the target color, among luminance planes of the particular gamut;

a target point calculator to calculate a reference point and a target point corresponding to the relative reference color and the relative target color respectively, in a luminance plane including the input color signal;

a chromaticity converter to convert a chromaticity of the input color signal based on a vector between the reference point and the target point in a plane including the input color signal and having a fixed luminance; and a luminance converter to convert a luminance of the input color signal having the converted chromaticity based on a luminance change between the reference color and the target color.

13. The color conversion apparatus of claim 12, wherein the target point calculator calculates the target point by applying a weight so that the vector to be used to convert the chromaticity of the input color signal increases as the luminance of the input color signal approaches a luminance of the reference color.

14. The color conversion apparatus of claim 12, wherein the luminance converter converts the luminance of the input color signal by applying a weight so that the luminance change to be used to convert the luminance of the input color signal increases as the chromaticity component of the input color signal having the converted chromaticity approaches the target point.

15. The color conversion apparatus of claim 12, wherein the chromaticity converter calculates a relative color conversion amount of the color conversion vector between the reference point and the target point at the position of the input color signal, and converts the chromaticity of the input color signal in proportion to the relative color conversion amount.

16. The color conversion apparatus of claim 12, wherein the chromaticity converter converts the chromaticity of the input color signal using a distance ratio of a triangle comprising the reference point, the target point, and an intersection point where a line, passing through the reference point and the input color signal, meets the boundary of the particular gamut.

17. The color conversion apparatus of claim 12, wherein the color converter is adopted in response to the reference color being converted in the three-dimensional space of the particular gamut.

18. A color conversion method of selectively adjusting input colors, the method comprising:

using a processor to perform operations of:

converting an input color signal to a color signal in a color space that is based on a luminance component and a chromaticity component;

determining whether the input color signal of each pixel is in a particular gamut to which the color is converted, among gamuts of a color reproducing apparatus;

performing a color conversion of the input color signal according to a shape of the particular gamut using a reference color, which is a reference of a conversion amount of the input color signal and present in the particular gamut, and a target color which is converted from the reference color; and converting the input color signal, which is converted to the color space having the luminance component, to a color signal in a color space displayable on the color reproducing apparatus.

19. The color conversion method of claim 18, further comprising:

storing information relating to the particular gamut, wherein the information pertains to a minimum luminance value, a maximum luminance value, and vertices of the particular gamut which is a polyhedron.

20. The color conversion method of claim 18, wherein the determining whether the input color signal of each pixel is in a particular gamut comprises:

determining whether a luminance component of the input color signal is in the particular gamut;

calculating in the particular gamut a plane that has a fixed luminance value equal to a luminance value of the luminance component of the input color signal; and determining whether the input color signal is within the calculated plane that has the fixed luminance value.

21. The color conversion method of claim 20, wherein the determining of whether the luminance component of the input color signal is in the particular gamut comprises determining whether the luminance component of the input color signal is greater than the minimum luminance value and less than the maximum luminance value of the particular gamut.

22. The color conversion method of claim 18, wherein the performing the color conversion of the input color signal comprises:

calculating a distance of a line from the reference color in the particular gamut to a boundary of the particular gamut by way of the input color signal; and converting the input color signal using a distance ratio of a triangle including the reference color, the target color, and an intersection point of the line and the boundary of the particular gamut.

23. The color conversion method of claim 22, wherein the converting of the input color signal is performed according to a ratio of the distance between the reference color and the intersection point to a distance between the input color signal and the intersection point, which equals a ratio of a distance between the reference color and the target color to a distance between the input color signal to the converted color signal.

24. The color conversion method of claim 22, wherein the color conversion of the input color signal is performed in response to the reference color being converted in a three-dimensional space of the particular gamut, and the particular gamut being a convex polyhedron.

25. The color conversion method of claim 18, wherein the performing the color conversion of the input color signal comprises:

calculating a color conversion vector between the reference color and the target color;

calculating a relative color conversion amount of the conversion vector at a position of the input color signal; and converting the input color signal using the relative color conversion amount.

26. The color conversion method of claim 25, wherein the calculating of the relative conversion amount comprises:

calculating a reference point on a line that includes the input color signal, wherein the line including the input color signal is parallel with a direction of the conversion vector; and calculating a distance between the reference color and the target color on a line passing through the reference color and the target color, as a relative distance between the reference point and a target point to which the reference point is converted on the line including the reference point.

27. The color conversion method of claim 25, further comprising:

calculating a weight to increase the relative color conversion amount as a difference between the luminance component of the input color signal and a luminance value of the reference color reduces during the calculation of the relative color conversion amount.

28. The color conversion method of claim 25, wherein the color conversion of the input color signal is performed in response to the reference color being converted in the three-dimensional space of the particular gamut.

29. The color conversion method of claim 18, wherein the performing the color conversion of the input color signal comprises:

calculating a relative reference color, which is a relative position of the reference color in a luminance plane including the reference color, and a relative target color, which is a relative position of the target color in a luminance plane including the target color, among luminance planes of the particular gamut;

calculating a reference point and a target point corresponding to the relative reference color and the relative target color respectively, in a luminance plane including the input color signal;

converting a chromaticity of the input color signal based on a vector from the reference point to the target point in a plane including the input color signal and having a fixed luminance; and converting a luminance of the input color signal having the converting chromaticity based on a luminance change between the reference color and the target color.

30. The color conversion method of claim 29, wherein the target point is calculated by applying a weight so that the vector to be used to convert the chromaticity of the input color signal increases as the luminance of the input color signal approaches a luminance of the reference color.

31. The color conversion method of claim 29, wherein the luminance of the input color signal is converted by applying a weight so that the luminance change to be used to convert the luminance of the input color signal increases as the chromaticity component of the input color signal having the converted chromaticity approaches the target point.

32. The color conversion method of claim 29, wherein the calculating of the chromaticity calculates a relative color conversion amount of the color conversion vector between the reference point and the target point at the position of the input color signal, and converts the chromaticity of the input color signal in proportion to the relative color conversion amount.

33. The color conversion method of claim 29, wherein the chromaticity of the input color signal is converted using a distance ratio of a triangle comprising the reference point, the target point, and an intersection point where a line, passing through the reference point and the input color signal, meets the boundary of the particular gamut.

34. The color conversion method of claim 29, wherein the performing the color conversion of the input color signal is adopted in response to the reference color being converted in the three-dimensional space of the particular gamut.

35. At least one non-transitory computer readable medium storing instructions that control at least one processor to perform a method of selectively adjusting input color signals, the method comprising:

converting an input color signal to a color signal in a color space that is based on a luminance component and a chromaticity component;

determining whether the input color signal of each pixel is in a particular gamut to which the color is converted, among gamuts of a color reproducing apparatus;

performing a color conversion of the input color signal according to a shape of the particular gamut using a reference color, which is a reference of a conversion amount of the input color signal and present within the particular gamut, and a target color which is converted from the reference color; and converting the input color signal, which is converted to the color space having the luminance component, to a color signal in a color space displayable on the color reproducing apparatus.

36. A color conversion method of selectively adjusting input colors, the method comprising:

using a processor to perform operations of:

performing a color conversion of an input color signal having been converted to a color signal in a color space that is based on a luminance component and a chromaticity component according to a shape of an available gamut to which the color is converted using a reference color, the reference color being a reference to a conversion amount of the input color signal and being present in the available gamut, and a target color which is converted from the reference color; and converting the input color signal which has been converted to the color space having the luminance component and chromaticity component to a color space displayable on a color reproducing apparatus.

37. The method of claim 36, further comprising converting the input color signal to a color space having a luminance component before performing the color conversion.

38. The method of claim 36, further comprising determining whether each pixel of the input color signal is in the available gamut before performing the color conversion.

39. The method of claim 36, further comprising storing information of the available gamut, the information pertaining to a minimum luminance value, a maximum luminance value, and vertices of the available gamut.

40. The method of claim 36, wherein the shape of the available gamut is a polyhedron.

41. A color conversion apparatus to selectively adjust input colors, the apparatus comprising:

a color converter to perform a color conversion of an input color signal having been converted to a color signal in a color space that is based on a luminance component and a chromaticity component according to a shape of an available gamut to which the color is converted using a reference color, the reference color being a reference to a conversion amount of the input color signal and being present in the available gamut, and a target color which is converted from the reference color; and a color space converter to convert the input color signal which has been converted to the color space having the luminance component and chromaticity component to a color space displayable on a color reproducing apparatus.

42. The method of claim 41, wherein the space converter further converts the input color signal to a color space having a luminance component before performing the color conversion.

43. The method of claim 41, further comprising a region determiner to determine whether each pixel of the input color signal is in the available gamut before performing the color conversion.

44. The method of claim 41, further comprising a gamut storage to store information of the available gamut, the information pertaining to a minimum luminance value, a maximum luminance value, and vertices of the available gamut.

45. The method of claim 41, wherein the shape of the available gamut is a polyhedron.

* * * * *

UNITED STATES PATENT AND TRADEMARK OFFICE
CERTIFICATE OF CORRECTION

PATENT NO. : 7,756,329 B2
APPLICATION NO. : 11/358036
DATED : July 13, 2010
INVENTOR(S) : Young-shin Kwak et al.

It is certified that error appears in the above-identified patent and that said Letters Patent is hereby corrected as shown below:

Column 20, Line 64, delete "non-transistory" and insert --non-transitory--.

Signed and Sealed this

Thirtieth Day of November, 2010

David J. Kappos
*Director of the United States Patent and Trademark Office*